US008770486B2

(12) United States Patent
Naifeh et al.

(10) Patent No.: US 8,770,486 B2
(45) Date of Patent: Jul. 8, 2014

(54) ARRANGEMENT, APPARATUS, AND ASSOCIATED METHOD, FOR PROVIDING STORED DATA IN SECURED FORM FOR PURPOSES OF IDENTIFICATION AND INFORMATIONAL STORAGE

(76) Inventors: Gregory P. Naifeh, Dallas, TX (US); Jerome G. Naifeh, Dallas, TX (US)

(*) Notice: Subject to any disclaimer, the term of this patent is extended or adjusted under 35 U.S.C. 154(b) by 1045 days.

(21) Appl. No.: 11/438,098

(22) Filed: May 19, 2006

(65) Prior Publication Data

US 2006/0273436 A1    Dec. 7, 2006

Related U.S. Application Data

(60) Provisional application No. 60/682,925, filed on May 19, 2005.

(51) Int. Cl.
*G06K 5/00* (2006.01)
*G06K 21/06* (2006.01)
*G06K 7/00* (2006.01)
*G06K 19/00* (2006.01)

(52) U.S. Cl.
USPC ............ 235/492; 235/380; 235/486; 235/487

(58) Field of Classification Search
USPC ......... 235/380, 492, 462.01, 382.5, 379, 382, 235/487, 486; 340/825.34, 573.1, 5.61; 705/51, 41; 713/171, 184
See application file for complete search history.

(56) References Cited

U.S. PATENT DOCUMENTS

| | | | |
|---|---|---|---|
| 4,874,935 A * | 10/1989 | Younger | 235/492 |
| 5,291,399 A * | 3/1994 | Chaco | 235/380 |
| 5,530,232 A * | 6/1996 | Taylor | 235/380 |
| 5,590,038 A * | 12/1996 | Pitroda | 705/41 |
| 5,742,756 A * | 4/1998 | Dillaway et al. | 726/20 |
| 6,101,477 A * | 8/2000 | Hohle et al. | 235/380 |
| 6,140,936 A * | 10/2000 | Armstrong | 235/492 |
| 6,747,561 B1 * | 6/2004 | Reeves | 340/573.1 |
| 6,955,299 B1 * | 10/2005 | Pathmasuntharan et al. | 235/492 |
| 7,137,553 B2 * | 11/2006 | Register et al. | 235/380 |
| 7,297,062 B2 * | 11/2007 | Gatto et al. | 235/380 |
| 2002/0023215 A1 * | 2/2002 | Wang et al. | 713/171 |
| 2002/0123967 A1 * | 9/2002 | Wang | 705/51 |
| 2002/0191816 A1 * | 12/2002 | Maritzen et al. | 382/115 |
| 2003/0030542 A1 * | 2/2003 | von Hoffmann | 340/5.61 |
| 2003/0106935 A1 * | 6/2003 | Burchette, Jr. | 235/380 |
| 2003/0132298 A1 * | 7/2003 | Swartz et al. | 235/472.02 |
| 2004/0255081 A1 * | 12/2004 | Arnouse | 711/115 |
| 2005/0269401 A1 * | 12/2005 | Spitzer et al. | 235/380 |
| 2007/0189581 A1 * | 8/2007 | Nordentoft et al. | 235/380 |

* cited by examiner

*Primary Examiner* — Thien T Mai

(57) ABSTRACT

Card member apparatus, and an associated method, for storing and permitting selectable use of informational data associated with a subject. Identifying indicia stored at a first storage element, and the informational data is stored at a second storage element, together disposed upon a substrate, or otherwise supported to permit carriage by a subject. The card member is presented for reading at a card reader, and analysis is made of the identifying indicia stored at the storage element. If the identifying indicia is ascertained to correspond to the subject that carries the card member, permission is granted for the access to the informational data stored at the card member. The informational data, once accessed, is used pursuant to a transaction associated with the subject.

18 Claims, 4 Drawing Sheets

ARRANGEMENT, APPARATUS, AND ASSOCIATED METHOD, FOR PROVIDING STORED DATA IN SECURED FORM FOR PURPOSES OF IDENTIFICATION AND INFORMATIONAL STORAGE

CROSS-REFERENCE TO RELATED APPLICATION

The present invention claims the priority of Provisional Patent Application Ser. No. 60/682,925, filed on May 19, 2005, the contents of which are incorporated herein by reference.

The present invention relates generally to a manner by which to store data that permits its retrieval, and subsequent use, only if certain identification indicia of the subject about which the data pertains is met. More particularly, the present invention relates to a card member apparatus, and an associated method, that provides for electronic storage of data, such as medical or financial data, and selectable access to the data. Access to the data is permitted upon verification that the identity of the holder of the card member, viz. the person that carries the card member, is the same as that about whom the information pertains. Once verification is made, the information is accessed, and used pursuant to a transaction associated with the subject that carries the card.

BACKGROUND OF THE INVENTION

Many aspects of modern life require the delivery of, or exchange of, information. In the past, information has generally been stored on paper records. And, when the information is to be delivered elsewhere, or exchanged with other information, paper records are forwarded or recreated.

While use of paper documents is, of course, an acceptable and workable manner by which to store and forward information, the development of electronic storage elements provides for the storage of data in electronic form and provides many opportunities related to information storage and transfer. Storage elements that provide for the storage of data in electronic form are, in many instances, of very small dimensions while still permitting storage of very large amounts of data. And, as technologies progress, the storage elements in which data is storable shall likely continue to permit ever increasing amounts of data to be stored in storage elements of increasingly reduced dimensions. The ability to store amounts of data previously requiring large bundles of paper when stored in paper form is already possible. As storage capacities increase, the capability to store even greater amounts of data shall be possible.

Medical and financial records, for instance, are storable in electronic form in electronic storage elements. When an electronic storage element at which such data is stored is nonvolatile or requires only nominal amounts of energy to maintain the stored data, the storage elements are easily constructed to be of dimensions permitting their hand carriage. For instance, a storage element is supportable upon a substrate, such as a card member of dimensions corresponding to the dimensions of a typical credit or charge card. Data pertaining to a subject, such as the subject's medical or financial information, once stored at the storage element, is easily carriable by the subject. When subsequently needed, the data is accessed and used, as needed. Much greater amounts of data are able easily to be carried by the subject than when the data is embodied in paper form.

Various issues arise, however, when large amounts of potentially sensitive information of a subject is stored electronically in an electronic storage element and carried by the subject, the subject might well not want the stored data easily to be accessible. A storage mechanism, capable of storing data pertaining to a subject in electronic form while also permitting limited access to the stored data is, accordingly, needed.

It is in light of this background information related to the storage of data that the significant improvements of the present invention have evolved.

SUMMARY OF THE INVENTION

The present invention, accordingly, advantageously provides apparatus, and an associated method, by which to store data in a manner that permits its subsequent retrieval and use pursuant to performance of a task associated with a subject.

Through operation of an embodiment of the present invention, a manner is provided for electronically storing data, such as medical or financial data, and for permitting selectable access to the data.

Access to the data is permitted upon verification that the identity of the subject carrying the card member corresponds to the identity of the one about whom the stored information pertains.

In one aspect of the present invention, a card member, or the like, includes an electronic storage element at which identification and other informational data is stored. The data that is stored on the card member is selectably accessible by an appropriate party and is used pursuant to a function associated with the subject. In another aspect of the present invention, identifying indicia is stored at the electronic storage element. The identifying indicia identifies the subject. The identifying indicia is formed, for instance, of physical indicia that identifies a physical characteristic of the subject. The physical indicia comprises, for instance, a digital representation of the physical likeness of the subject, a digital representation of fingerprint information, biometric information, or any other information that identifies the subject of whom the data is stored at the storage element.

In another aspect of the present invention, the card member at which the storage element is embodied is connectable to a card reader that is configured to access the contents of the storage element when the card member is suitably connected thereto. In one implementation, the functionality of the card reader is distributed to permit remote access to the contents of the storage element. That is to say, a portion of the card reader is positioned in proximity to the card member, and another portion of the card reader is remotely located but maintained in connectivity with the portion of the card reader that connects with the card member.

The identifying indicia stored at the storage element is accessed when the card member is connected to the card reader. And, the accessed information is analyzed to ascertain whether the identifying indicia identifies the same subject in whose possession that the card member resides when the card member is connected to the card reader. Most simply, an operator of the card reader forms the analysis by visually comparing the retrieved information with the subject in whose visual presence that the subject is positioned when the analysis is made. Or, the subject is required to submit information, such as providing a fingerprint or biometric data or provide other information to permit the analysis to be performed.

If the analysis indicates that the subject whose information is stored at the storage element corresponds to the subject that presents the card for reading, the subject is verified. And, upon verification, further action is permitted.

In another aspect of the present invention, information data is also stored at the storage element, accessible only upon verification of the identity of the subject. The informational data pertains, in some aspect, to the subject. For instance, in one implementation, the informational data forms medical data related to the subject, such as the subject's medical history. And, in another implementation, the informational data forms financial data related to the subject. The memory capacity of the storage element permits storage of significant amounts of data, easily capable of storing, e.g., a subject's entire medical history, including insurance billing history, as well as information related to all aspects of the subject's health needs. While stored at the storage element and easily carriable by the subject, access to the stored, informational data is permitted only upon verification that the subject presenting the card corresponds to the subject whose identifying indicia is also stored at the storage element. Thereby, privacy concerns related to the improper release of the stored contents of the storage element are alleviated.

In another aspect of the present invention, upon verification that the identification indicia of the subject stored at the storage element corresponds with the subject presenting the storage element, permission to access the storage element contents pertaining to the informational data is made at the card member at which the storage element is embodied. For instance, a code is generated at a card reader and provided to the card member, thereby to provide a further level of security preventing unauthorized access to the contents of the storage element.

Thereby, a manner is provided by which to permit a subject conveniently to carry large amounts of data pertaining to the subject while limiting access to the data. When access is permitted, the data is used pursuant to performance of a task related to the subject.

In these and other aspects, therefore, card member apparatus, and an associated methodology associated with a subject is provided. A first storage element is configured to store identifying indicia that is uniquely associated with, and identifiable of, the subject. The identifying indicia, when accessed, is usable to verify identification of the subject. A second storage element is configured to store informational data associated with the subject. The informational data stored at the second storage element is accessible responsive to verification of the identification of the subject through access to the identifying data stored at the first storage element. The informational data, once accessed, is usable in performance of a task associated with the subject.

A more complete appreciation of the present invention and the scope thereof can be obtained from the accompanying drawings that are briefly summarized below, the following detailed description of the presently-preferred embodiments of the present invention, and the appended claims.

DETAILED DESCRIPTION

Figure 1:
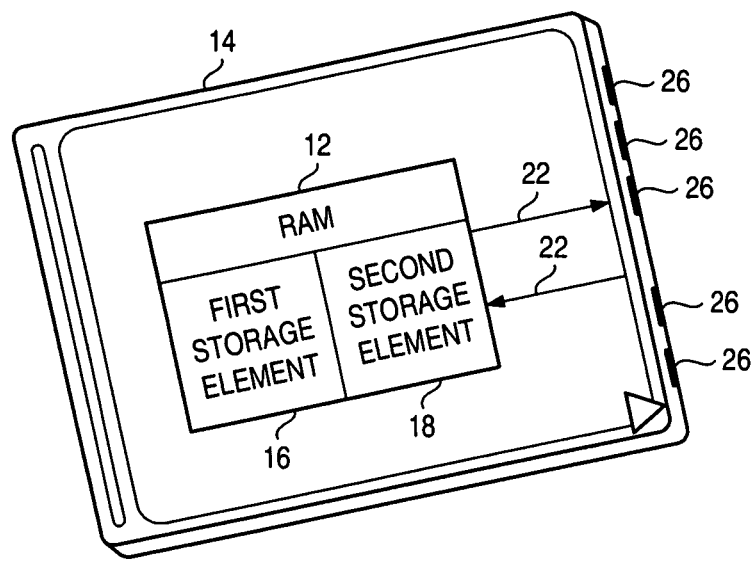
FIG. 1 illustrates a functional block diagram of a card member apparatus of an embodiment of the present invention.

Referring first to FIG. 1, a card member, shown generally at 10, of an exemplary embodiment of the present invention is represented. The card member 10 includes a storage device 12 supported at a support structure 14. In the embodiment illustrated in the figure, the storage device forms a non-volatile, random access memory (RAM) that permits long-term storage of data in digital form. The support structure 14 illustrated in the figure that supports the RAM forming the support device comprises a card member, or other substrate, at which the storage device is supportedly affixed. In other embodiments, the support structure is formed in other manners, configured to support the storage device in other manners. And, in other embodiments, the storage device also is formed in other manners, such as memory devices necessitating only small levels of energy for memory maintenance or other mass-storage elements. In one implementation, for instance, the card member apparatus is embodied as a so-called thumb drive, connectable by way of a universal serial bus (USB) port of a computer-station device or its peripheral.

The storage device comprises memory locations that are, in the exemplary implementation, segmented to form two, or more, functional storage elements, here identified as a first storage element 16 and a second storage element 18. The first storage element 16 is used to store identifying indicia, viz. digital representations of the identifying indicia. And, the second storage element is used to store informational data, again, values corresponding to digital representations of the data.

The memory locations of the storage elements 16 and 18 are selectably accessible, here by way of conductive paths 22. The conductive paths extend to a connector 26 that is configured to provide connections to permit external access to the memory locations of the storage elements of the storage device. In the exemplary implementation, the storage device is of a memory capacity of many megabytes to permit the storage of significant amounts of data, supported at a card-shaped support substrate, permitting easy carriage by a subject, even carriage of the apparatus in a wallet carried by the subject. In contrast to paper-storage of information, the storage of the data at the card member apparatus provides a significant advantage over use of paper storage of data. A single card member is capable of storing the large data that would require a large number of pages upon which to print data. A subject is able to access, merely by carrying the card member, all of the information about the subject that might be needed. Inadvertent omission of one or more sheets of data need not occur as the data is stored at the card member.

Figure 2:
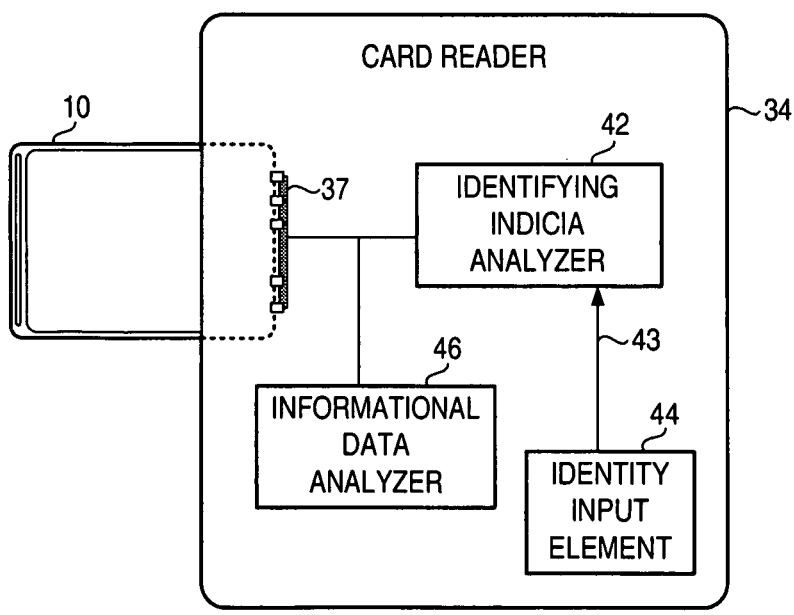
FIG. 2 illustrates a functional block diagram of the card member apparatus of another embodiment of the present invention.

FIG. 2 illustrates the card member apparatus of a further embodiment of the present invention. Here, the card member 10 is positioned, in communication connectivity, with a card reader 34. The card reader includes a connector 37 that provides for connection with the corresponding connector 26 (shown in FIG. 1) of the card member 10. The connector 37, in one implementation, forms a slotted opening having conductive contacts positioned to engage with corresponding contacts of the connector 26 of the card member when suitably positioned at the card reader. The card reader includes an identifying indicia analyzer 42 positioned in connectivity with the first storage element 16 of the card member when the card member is positioned at the card reader, as shown in FIG. 2. The identifying indicia analyzer operates to analyze the contents of the first storage element to verify the subject's identity. The analyzer 42 is provided with additional information, here represented by way of the line 43, to permit the verification to be made, or denied, by the analyzer. In the exemplary implementation, the line 43 extends from an identity input element 44 at which the subject carrying the card provides identity input information. The identity input information provided at the identification input element and provided, by way of the line 43, to the analyzer 42 corresponds, in type, to the identifying indicia stored at the first storage element 16. When the identifying indicia forms a representation of a photographic image, the identification input element forms, for instance, a photographic camera for recording a visual image of the subject who presents the card for reading. Or, for instance, when the identifying indicia forms fingerprint information, the element 44 forms a fingerprint reader for reading the fingerprint of the subject that prevents the card member from reading. If, for instance, the identifying indicia forms biometric data, the element 44 forms a biometric information receiver. When the identifying indicia is formed of other information, the identification input element is constructed to provide for input of corresponding information. And, most simply, when the card reader, in an alternate embodiment, is operated by an operator, the operator generates manual inputs that are provided by way of the line 43 to the analyzer. When the identifying indicia comprises a representation of a photographic image, the image, in one implementation, is displayable at a display element (not shown) of the, connected to the, card reader. The operator of the card reader is able to compare the visual image with the actual image of the subject to ascertain their commonality and verify that the subject presenting the card for reading is the subject whose information is stored at the storage element of the card member.

The data stored at the second storage element is accessible only if the identifying indicia stored at the first storage element is verified to be that of the subject that presents the card member for reading at the card reader or otherwise is verified to be data that should be permitted to be accessed. In one implementation, the analyzer provides a message, or signal, that is returned to the card member to permit the memory locations of the second storage element to be accessed. In either manner, if the subject presenting the card is verified to be the same as the subject identified by the identifying indicia stored at the first storage element, the card reader is provided with access to the memory location of the second storage element.

The card reader further includes an informational data analyzer 46 that is configured to have access to the memory locations of the second storage element, by way of the connectors 26 and 36 subsequent to verification by the identifying indicia analyzer of the identity of the subject. The information, once accessed, is used pursuant to performance of a task associated with the subject.

When, for instance, medical history, such as billing and insurance information, is stored at the second storage element, the information is made available upon verification that the subject corresponds to the subject whose identity is that whose identity is stored at the storage device.

FIG. 3 again illustrates the card member 10 positioned at a card reader 34. Again, the card member includes a storage device 12 that includes, and defines, first and second storage elements 16 and 18. Here, the card reader is bifurcated, having a first portion 34-1 and a second portion 34-2. In the illustrated implementation, the connector 37 of the card reader is positioned at the first portion 34-1 to provide for the connection with the connector 26 of the card member. The analyzers 42 and 46 are positioned remotely, at the portion 34-2. The contents of the first storage element are accessed by the analyzer 42 by way of its connection to the first portion of the card reader by way of the communication fabric 52. Operation of the card reader, and the elements thereof are otherwise analogous to those described with respect to operation of the card reader 34 shown in FIG. 1. By permitting the remote positioning of the portion of the card reader, when operated by an operator, the operator need not be positioned in proximity to the subject and the card carried by the subject. When visual identification forms the manner by which the subject is verified, a photographic or videographic camera device is positioned at the first portion of the card reader. The subject is presented for verification at the camera or videographic device and the image is communicated by way of the communication fabric 52 to the second portion 34-2 for verification of the subject's identity, vis-a-vis the identifying indicia stored at the first storage element, and retrieved for analysis by the analyzer 42.

Figure 3:
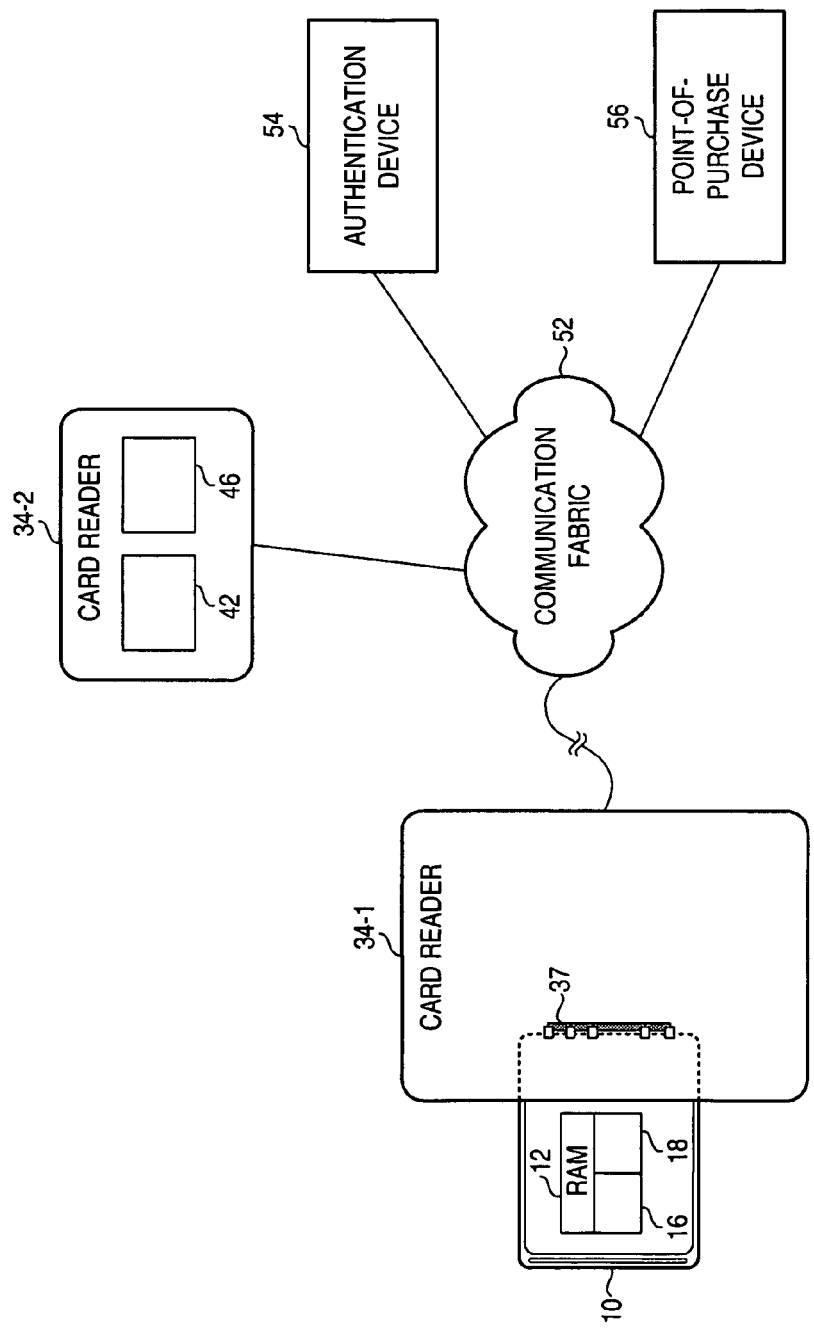
FIG. 3 illustrates a sequence diagram representative of operation of an embodiment of the present invention.

In an exemplary implementation, the configuration shown in FIG. 3 is used in conjunction with commercial transactions in which the card member 10 forms a credit or debit card type of device. The card is used pursuant to an in-store purchase, a phone purchase, or a smart-phone purchase. The implementation shown in FIG. 3 is also representative of a purchase made by way of a subject's PDA (personal digital assistant) or PC (personal computer). Again, both identifying indicia and informational data is stored at the storage elements 16 and 18 of the storage device. The informational data includes, for instance, purchase information available for subsequent use, subsequent to the making of a purchase, for the request of a refund on a product or service pursuant to its return. The informational data includes, for instance, a purchase confirmation number, or cancellation number, that is automatically saved at the storage element.

The identifying indicia and informational data in a further implementation, is secured, e.g., by a password protection scheme, encrypted by an encryption algorithm, or is destructable after a selected period of time. Access to the data stored at the card member is thereby limited. In one implementation, the security scheme that is used prevents access to the informational data stored at the second storage element 18 until the subject that carries the card is verified through analysis of the identifying indicia.

In one implementation, the card member forms a secure digital card. Unauthorized access to the card is prevented. Access that might otherwise lead to fraud, identity theft, or other unauthorized use of the information that is stored at the card member is prevented through use of the security scheme. The secure digital card is implementable as a bank card, a merchant credit card, a medical secure data card, a government identification card, a casino player card, and a school identification card.

When implemented as a bank card, the card member, forming a secure digital card, operates as a credit card, a debit card, an ATM card, or a check card. When implemented as a merchant credit card, the card member forming the secure digital card, operates as a department store or other retail store card, a gasoline station card, etc.

When implemented as a medical secure data card, the medical history of the patient, including, e.g., all of the patient's information from birth is stored in secure form at the card member. Billing records include, e.g., insurance company billing records, private insurance company billing records, Medicare billing records, Medicaid billing records, and military billing records, as well as corresponding, and other, treatment records.

Informed as a government identification card, the card member comprises, e.g., a Social Security card, a passport identification card, a visa identification card, a green card, a foreign student identification card, or other identification card used in conjunction with governmental operations and services. For instance, the card member is implementable as a driver's license, issuable by a state or local governmental entity.

In another implementation, the card member forms a casino player card in which player information, cash balances, winnings, and other information relating to gambling and resort visitation is all stored, available for subsequent use pursuant to a subject-related transaction. When implemented as a school identification card, the card member stores student information, such as student information related to a student attending a public or private school, a college, or university.

In any implementation, the identifying indicia identifies the subject associated with the card. The identifying indicia includes picture identification, such as jpeg information and mpeg information, biometric information, fingerprint information, facial recognition information, eye-iris recognition, and DNA information.

Continuing with the implementation of FIG. 3 in which the card member is used pursuant to a commercially-related transaction, verification is made by the analyzer 38 that the subject is authorized to make use of the card pursuant to the commercial transaction. The illustration of FIG. 3 further shows an authentication device 54 and a point of purchase device 56.

Subsequent to verification by the analyzer 42 of the card reader portion 34-2, the subject associated with the card member, i.e., here, the purchaser, places a purchase order with the point of purchase location 56. The informational data stored at the card member is accessible by the point of purchase device. The authentication device 54 operates to perform authentication of the purchase. In one implementation, a tunnel is formed between the authentication device and the card reader at which the card member is positioned.

Figure 4:
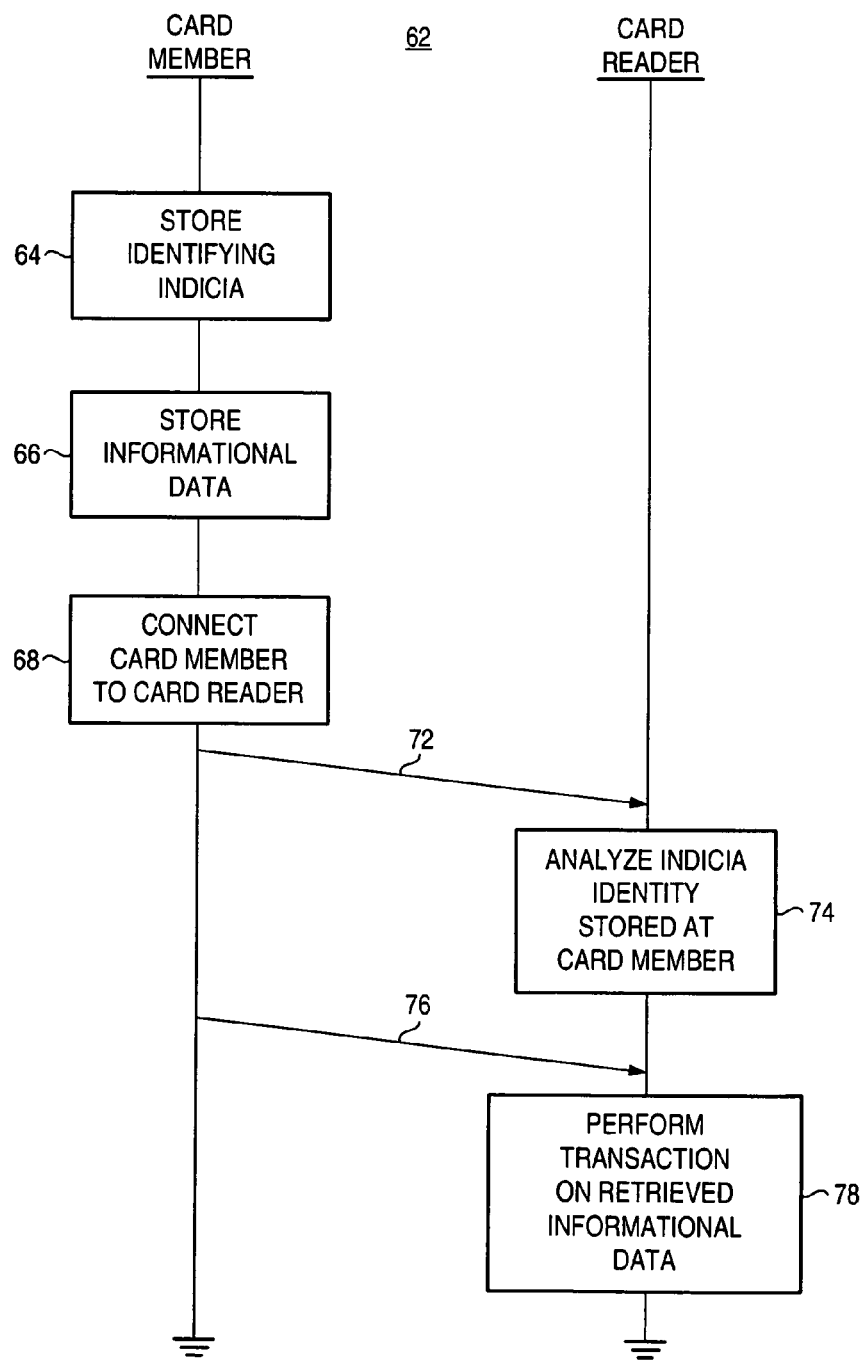
FIG. 4 illustrates a method flow diagram listing the method steps of the method of operation of an embodiment of the present invention.

FIG. 4 illustrates a sequence diagram shown generally at 62, representative of exemplary operation of an embodiment of the present invention. Here, and as indicated by the blocks 64 and 66, identifying indicia and informational data is stored at the card member.

Then, and as indicated by the block 68, the card member is connected to a card reader 36. The card reader accesses, as indicated by the segment 72, the identifying indicia stored at the card member. Analysis is performed, as indicated by the block 74, at the card reader. A determination is made whether the identifying indicia identifies a subject that presents the card at the card reader. If so, the card reader accesses the informational data, here indicated by way of the lines 76, and utilizes the retrieved informational data, here indicated at the block 78, pursuant to a transaction associated with the subject.

Figure 5:
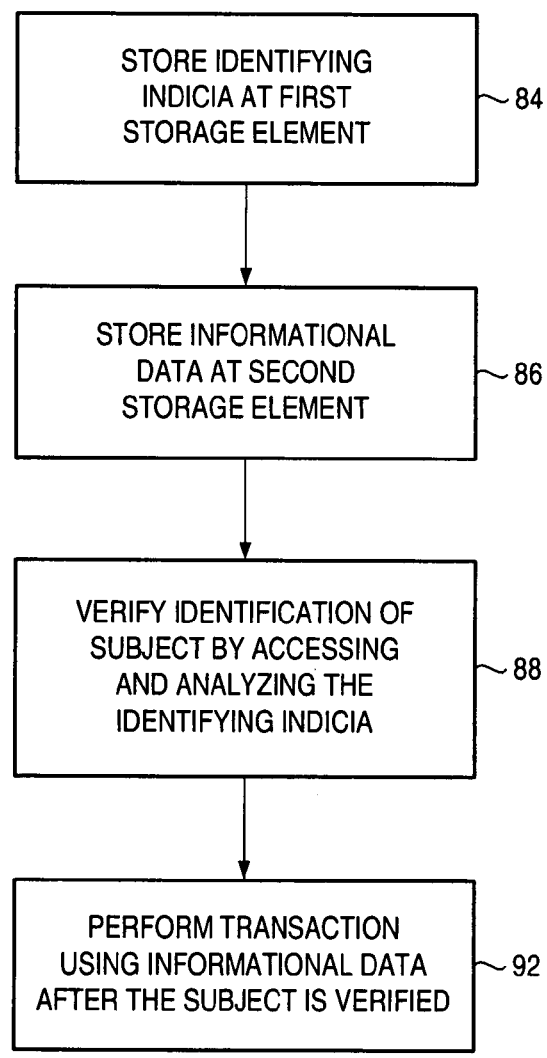
FIG. 5 illustrates a method flow diagram listing the method of operation of an embodiment of the present invention.

FIG. 5 illustrates a method flow diagram, shown generally at 82, representative of the method of operation of an embodiment of the present invention. The method is for using informational data associated with a subject.

First, and as indicated by the block 84, identifying indicia that is uniquely associated with, and identifiable of, the subject is stored at a first storage element.

Then, and as indicated by the block 86, informational data is stored at a second storage element.

Thereafter, and as indicated by the block 88, identification of the subject is verified by accessing and analyzing the identifying indicia. Then, and as indicated by the block 92, the informational data stored at the second storage element is used pursuant to a task associated with the subject if the identification of the subject is verified.

Through the storing of the information at the storage element of the card member, the need otherwise to maintain written records relating to the stored information is obviated. And, the identity of an authorized user of the card is better ascertained.

The previous descriptions are of preferred examples for implementing the invention, and the scope of the invention should not necessarily be limited by this description. The scope of the present invention is defined by the following claims.

What is claimed is:

1. Card member apparatus for a card member associated with a subject, said card member apparatus comprising:
a first storage element configured to store identifying indicia uniquely associated with, and identifiable of, the subject on the card member; the identifying indicia accessible and, when accessed, usable to verify identification of the subject;
a second storage element configured to store informational data associated with the subject on the card member, the informational data stored at said second storage element accessible by permission made at the card member responsive to, and only upon, verification of the identification of the subject through access to the identifying indicia stored at said first storage element and responsive to providing of a code-reader-generated code thereto, the card-reader-generated code providing a further level of security additional to the verification provided through the access to the identifying data, the informational data, once accessed by permission made at the card member, usable in performance of a commercial transaction associated with the subject, the informational data including purchase information automatically saved at said second storage element and available for subsequent use,
a card reader having a first portion and a second portion, the second portion positioned remote from the first portion and connected thereto by way of a communication-fabric-connection, the first portion configured to connect to said first storage element and to said second storage element and configured selectably to access the identifying indicia stored at said first storage element and the informational data stored at said second storage element, the second portion of said card reader comprising an identifying indicia analyzer configured to compare the identifying indicia accessed, by way of the communication-fabric-connection with the first portion, from the first storage element on the card member with information generated at the card reader identifying the subject to verify the identification of the subject at the card reader, the second portion of said card reader providing a message, returned to the first portion of said card reader to permit access to said second storage element.

2. The card member apparatus of claim 1 further comprising an external access connector configured to provide selectable external access to said first storage element and to said second storage element.

3. The card member apparatus of claim 2 wherein said card reader comprises a card member connector configured to connect with the external access connector, the identifying indicia and the informational data selectably accessible when said card member connector is connected with said external access connector.

4. The card member apparatus of claim 2 wherein said identifying indicia analyzer is configured to verify the identification of the subject by comparing the identifying indicia with the subject.

5. The card member apparatus of claim 4 wherein the identifying indicia comprises a physical characteristic associated with the subject.

6. The card member apparatus of claim 3 wherein the card reader is operated by an operator and wherein the operator compares the identifying indicia accessed from said first storage element with the subject to verify the identification of the subject.

7. The card member apparatus of claim 2 wherein said card reader comprises an informational data analyzer configured to analyze the informational data pursuant to the performance of the commercial transaction associated with the subject.

8. The card member apparatus of claim 1 further comprising a substrate at which said first storage element and said second storage element are disposed.

9. The card member apparatus of claim 1 further comprising a support assembly configured to support said first storage element and said second storage element.

10. The card member apparatus of claim 1 wherein the informational data stored at said second storage element further comprises medical information associated with the subject.

11. The card member apparatus of claim 1 wherein the informational data stored at said second storage element further comprises financial information associated with the subject.

12. The card member apparatus of claim 1 wherein said second storage element comprises a read/write memory and wherein the informational data stored at said second storage element is selectably updateable.

13. A method for using informational data associated with a subject, said method comprising the operations of:
   storing at a card member apparatus of a card member identifying indicia uniquely associated with, and identifiable of, the subject at a first storage element of the card member apparatus of the card member;
   storing at the card member apparatus the informational data at a second storage element of the card member apparatus;
   connecting a first portion of a card reader with the first storage element and the second storage element;
   verifying at a second portion of the card reader, the second portion positioned remote from the first portion and connected thereto by way of a communication-fabric-connection, the identification of the subject by accessing the identifying indicia from the first storage element of the card member and comparing, at the second portion of the card reader, the identifying indicia accessed from the first storage element of the card member with information generated at the card reader identifying the subject to verify the identification of the subject;
   sending a message by the second portion of the card reader to the first portion of the cad reader to permit access to the second storage element;
   providing a code-reader-generated code to the card member apparatus, the code-reader-generated code providing a further level of security additional to the verification provided through the access to the identifying data; and
   granting permission at the card member apparatus of the card member to use the informational data stored at the second storage element of the card member of the card member apparatus pursuant to a commercial transaction associated with the subject only if the identification of the subject is verified during said operation of verifying, message sent by the second portion permits access to the second storage element, and upon, and responsive to, the code-reader-generated code provided during said providing.

14. The method of claim 13 wherein the identifying indicia stored during said operation of storing identifying indicia comprises physical indicia that identifies the subject.

15. The method of claim 13 wherein the first and second storage elements at which the identifying indicia and the informational data are stored are embodied at a common structure and wherein said operation of verifying is performed external to the common structure.

16. The method of claim 15 wherein said operation of verifying comprises connecting the common structure at which the first and second storage elements are embodied, retrieving the identifying indicia from the first storage element, and comparing the identifying indicia retrieved therefrom with corresponding identification information of the subject.

17. The method of claim 13 wherein the informational data further comprises medically-related information of the subject and wherein the commercial transaction pursuant to which the informational data is to be used comprises a medically-related task.

18. The method of claim 13 wherein comprising the further operation of selectably updating the informational data stored at the second storage element.

* * * * *